Patented Apr. 12, 1927.

1,624,453

UNITED STATES PATENT OFFICE.

JOHN WILKINSON, OF SYRACUSE, NEW YORK, ASSIGNOR TO H. H. FRANKLIN MANUFACTURING COMPANY, OF SYRACUSE, NEW YORK, A CORPORATION OF NEW YORK.

COOLING SYSTEM FOR AIR-COOLED MOTOR VEHICLE ENGINES.

Application filed August 31, 1922. Serial No. 585,333.

A cooling system for air cooled motor vehicle engines, which will cool the engine perfectly during long periods of time under all the varying and extreme conditions under which said engines are used, such as varying temperature, speed, load and road conditions, has been long sought, and as will be understood by those skilled in the art, no air cooling system or water cooling has heretofore been discovered which will cool perfectly under all such conditions, and the principal object of this invention is a cooling system which will cool the engine perfectly under all such conditions, so that the engine holds its power and efficiency and does not deteriorate and lose power under such conditions on account of becoming overheated.

This invention, therefore, relates to air cooled internal combustion engines and has for its object a particularly simple and efficient means and relative arrangement of the elements thereof for creating and moving a maximum volume of air with minimum power and conducting and distributing such volume to the engine cylinders with maximum speed and minimum resistance and back pressure to effect a predetermined maximum and efficient cooling.

The invention consists in the novel features and in the combinations and constructions and in the relativity of the features, all as hereinafter set forth and claimed.

In describing this invention, reference is had to the accompanying drawings, in which like characters designate corresponding parts in all the views.

Figure 3 is a plan view, parts being omitted, and parts being broken away and the upper section of the air conduit being removed.

This air cooled engine comprises, generally, a plurality of cylinders, a fan actuated by the crank shaft of the engine and mounted on one end of the crank shaft, a fan casing and means for conveying the air from the fan casing and distributing it among the cylinders, the fan being preferably mounted to require a minimum power to move a maximum body of air at maximum speed to effect and maintain the required cooling, and the fan casing and the air conducting means being so arranged relatively to the fan and to each other, and to the cylinders, as to move the maximum volume of air at a maximum speed with minimum back pressure and friction and to distribute the air equally to the cylinders.

1 designates the cylinders of the engine which are mounted upon the crank case 2, in which the crank shaft 3 is suitably journalled in any well-known manner.

4 is the centrifugal fan which is preferably mounted upon the front end of the crank shaft, the fan here illustrated being of the sirocco type.

5 designates the fan casing, which is spiral in general form and having an upwardly extending outlet or discharge portion 6 directly above the crank shaft and in line with the cylinders, the front and rear walls of the casing meeting the peripheral wall at substantially right angles and the outlet portion being rectangular in cross section.

The spiral wall 7 of the fan casing extends from near the periphery at 8 of the fan at one side of the outlet 6 and diverges away from the periphery of the fan to the opposite side of the outlet 6, which outlet, as before noted, is located directly above the crank shaft and the fan and in line with the cylinders. Such arrangement of the spiral wall and outlet provides a passage and outlet of maximum size.

Figure 1:
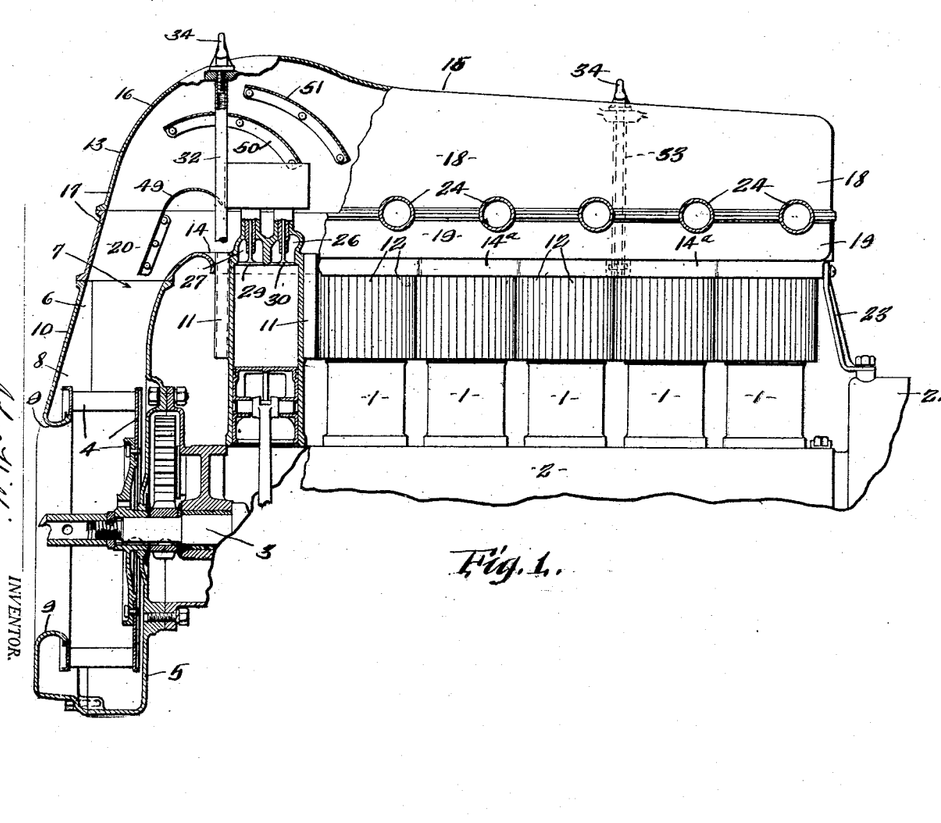
Figure 1 is a side elevation, partly in section, of my air cooled engine embodying this cooling means.
Figure 2:
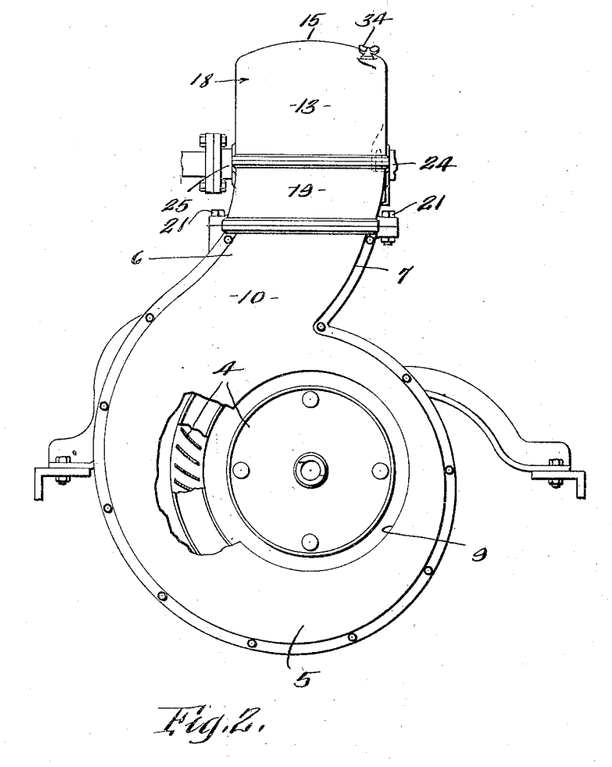
Figure 2 is a front elevation thereof, parts being omitted.
Figure 4:
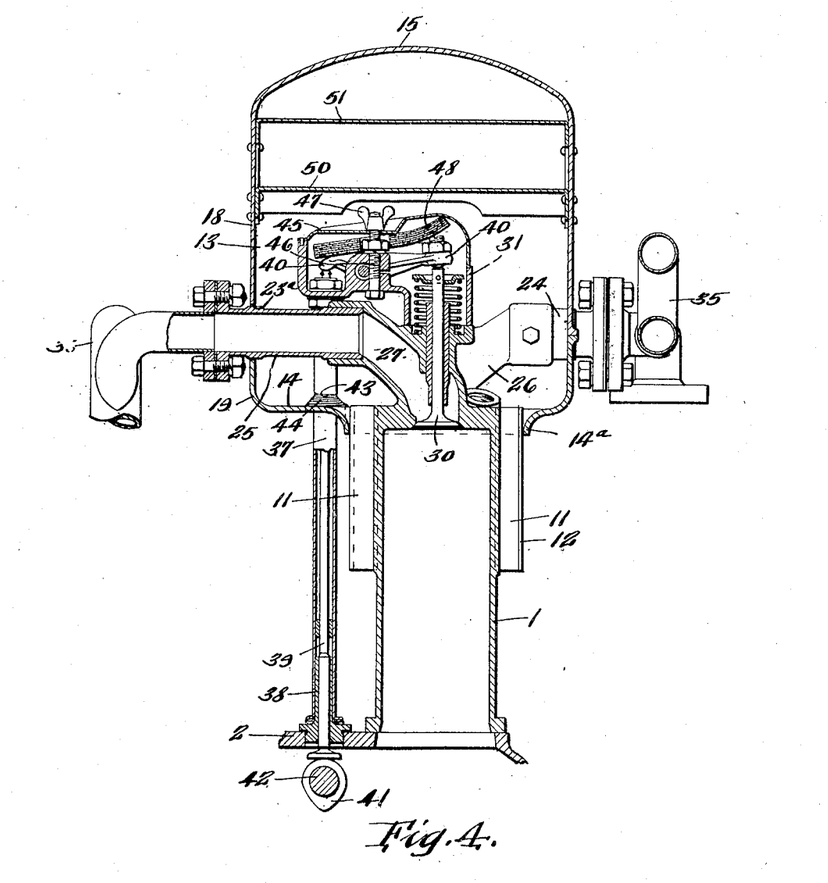
Figure 4 is an enlarged cross sectional view on the plane of line 4—4, Fig. 3.
Figure 5:
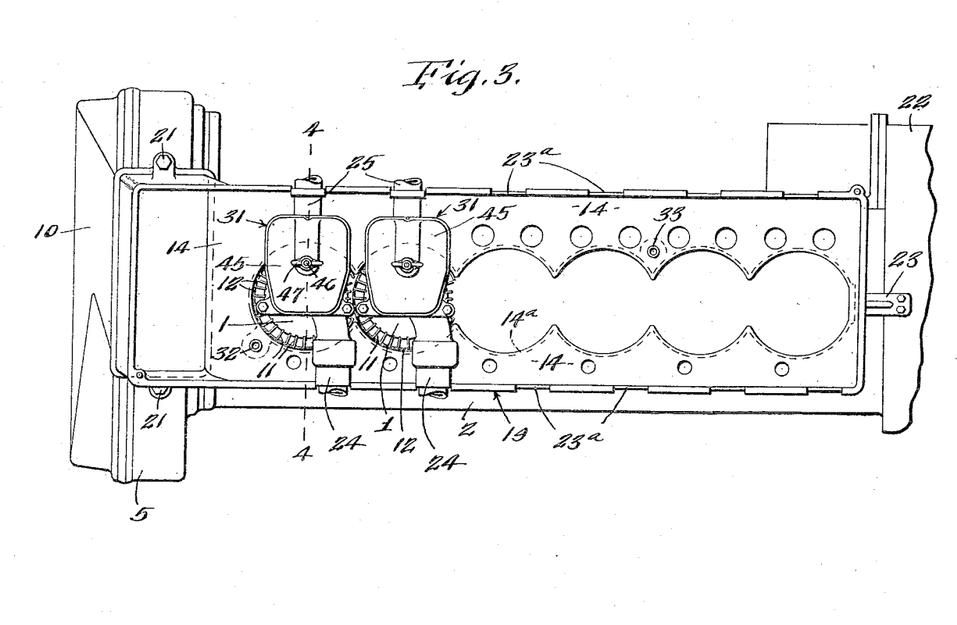

As seen in Figure 1, the entrance opening of the fan is in the form of a venturi 9 which directs the air into the fan the full width of the blades of the fan. The front wall 10 of the outlet is inclined rearwardly. The arrangement of the venturi causes the air feeding to the fan to be taken up between the fan blades, the full depth of such blades, so that the fan is always working to full capacity to move a maximum volume of air, this being so especially at low speeds. The passages around the cylinders are individual thereto and are usually shells or sleeves encircling the heat radiating flanges 11 of the cylinders, these passages being of greater diameter than the heads of the cylinders and the flanges 11, that is, they do not contract about the heads of the cylinders. As seen in Figures 1, 3 and 4, these passages are formed by circumferentially extending flanges 12 at the outer edges of the heat radiating flanges, each flange 12 terminating at its free edge near the next flange 11 so that all of the flanges 12 form practically a shell or sleeve.

13 designates the air conduit which communicates at its front end with the outlet 6 of the fan casing, extends over the heads of the cylinders and the upper ends of the shells formed by the flanges 12 and is closed at its rear end, this conduit having its bottom 14 arranged in approximately the same level as the heads of the cylinders and having openings in line with the upper ends of the passages around the cylinders.

As here illustrated, the bottom 14 is formed with depending annular flanges 14ª around the upper ends of the shells formed by the flanges 12. The bottom 14 is preferably flat and the passages formed by the flanges 12 open directly through the bottom which is of at least as great width as the diameter of such passages, as clearly seen in Figure 3. In practice, it is of considerably greater width than the passages formed by the flanges 12.

As here illustrated, the conduit is rectangular in general form in cross section and tapers from its front or entrance end toward its closed end, this tapering being effected by inclining the top wall 15 from the entrance end toward the closed end of the conduit. Also the top wall is rounding or convex in cross section.

The air conduit 13 is formed with a dome-shaped or hooded enlargement at its entrance end opposite the discharge opening of the fan outlet 6. This dome-shaped portion is formed by arranging the front portion of the top wall of the conduit, which is opposite the rectangular discharge opening of the fan casing, in a curve extending lengthwise of the air conduit and to a greater height than the remainder of the top of the air conduit, this curved portion 16 merging into the curved front wall of the air conduit, and being inclined at 17 in the same plane as the wall 10. The top wall, including the enlargement, is also curved or convexed outwardly in a crosswise direction.

This air conduit is preferably composed of upper and lower sections 18 and 19, the lower section being in the form of a channel having a depending rectangular entrance 20 at its front end which is secured to the upper rectangular end of the discharge portion 6 of the fan casing, in any suitable manner as by bolts 21. This section is supported at its rear end on the engine, as on the casing 22 for the fly wheel, by one or more brackets 23. The sections 18, 19, are provided with cutouts 23ª, in their meeting edges for the inlet and exhaust pipes 24 and 25, which are connected to the inlet and exhaust ports 26 and 27 of the heads of the cylinder. These ports 26, 27 are formed integral with the heads of the cylinders and are controlled by suitable valves 29 and 30. The heads are integral with the cylinder walls. Said ports project into the air conduit and the valve operating mechanism for each cylinder is located in a casing 31 mounted on said ports. The sections 18 and 19 are secured together in any suitable manner to permit the removal of the upper section 19, and as here shown, the lower section is provided with posts 32, 33, near its front and rear ends and on opposite sides thereof, these posts being located on the inside of the air conduit and extending to near the top of the conduit, and the top wall of the upper section 18 is provided with suitable openings for receiving screws as wing screws 34, which extend through said openings and thread into the tops of the posts, the heads of the screws thrusting against the top wall of the conduit.

The usual intake and exhaust manifolds 35 and 36 are connected to the inlet and exhaust pipes in any suitable manner.

The valve casings 31 referred to, are supported on the ports 27 and 28 at like ends and at their other ends by tubular posts 37, the lower ends of which are fitted over or attached to bushing 38 in the crank casing and the upper ends of which are extended through holes in the bottom of the air conduit and attached to the bottoms of said casings 31, and the valve lifting rods 39 which thrust at like ends against the rocker arms 40 in the casings and engage at their lower ends with cams 41 on the cam shaft 42, are located in these tubes 37. The holes in the bottom of the air conduit through which the tubes 37 extend, may be closed in any suitable manner, and as here shown, each tube 37 is formed with a suitable seat, as a groove at 43, for the small end of the conical spring 44, the larger end or base of the conical spring 44 thrusting against the bottom of the air conduit around the hole through which the tube extends. When these parts are assembled the coils of the spring lie close together and prevent the outlet of air from the conduit. Each valve casing 31 has a removable cover 45 which is secured in position in any suitable manner as by a threaded post 46 and nut 47. A sound deadener and oiler is arranged in each consisting of a pad 48 arranged beneath the cover and overlying the rocker arms 40, this pad being of substantially the same width as the interior of the casing 31, and having a hole for the post 46. The pad is usually soaked with oil to oil the rocker arms.

The means for distributing the air throughout the length of the air conduit 13 is located at the entrance end of the air conduit in the enlargement or dome-shaped portion 16 thereof. This means comprises one or more plates arranged in the air conduit below the top wall 16 thereof, three of such plates being shown. 49, 50 and 51 designate the plates or distributors, these plates being arranged one above the other and curved in a direction lengthwise of the air conduit, and having a different curvature than the curve of the dome-shaped portion in a lengthwise direction, but being horizontal in a transverse direction. Each of the plates 49, 50 and 51 is provided with suitable side flanges for attachment to the side walls of the air conduit.

The plates 49, 50, 51 distribute the air throughout the height as well as the width of the conduit 13, and prevent the air from packing or compressing along the top wall of the conduit. Owing to the fact that the air passes around the corner at the front end of the air conduit, it naturally would tend to pack against or follow the top wall of the conduit rather than the bottom wall. The plates prevent such unequal distribution.

As here illustrated, the lowermost plate 49 is secured in the entrance end of the lower section 19 of the air conduit 13 and projects in the upper section 18 in front of the first cylinder, and the other plates 50, 51, are carried in the hooded part of the upper section 18.

Owing to the arrangement of the fan 4 directly on the crank shaft and the arrangement of the fan casing with its comparatively large outlet directly above the fan and connected directly to the air conduit, a minimum power is required to move a maximum volume of air necessary for a predetermined cooling effect; owing to the passages around the cylinders opening directly through the bottom 14 of the air conduit 13 and to the passages being of greater width than, or at least of as great width as, the heads of the cylinders and flanges thereon, and owing to the shape of the air conduit, the air is conducted from the fan to the cylinders with minimum back pressure and friction and hence with greater cooling effect and further owing to the arrangement of the intake and exhaust ports projecting into such air conduit above its flat bottom, a maximum cooling is facilitated.

Further owing to the contour or inclining of the top wall of the air conduit and the arrangement of distributors and the enlarged front end thereof, and the incline of the front walls of the fan casing and air conduits at 10 and 17, the air is directed to, and distributed among, the cylinders or split up into layers which pass to the cylinders with practically no back pressure, or contrary or eddy currents. The mounting of the fan on the crank shaft, the arrangement of the fan casing, the air conduit, the passages around the cylinder and the distributing means at the front end of the air conduit and the relativity of these elements and features thereof, all cooperate to effect the movement of the maximum volume of air with maximum speed and with minimum power and back pressure to effect a predetermined cooling effect under all temperature, road, load and speed conditions.

What I claim is:

1. In an air cooled internal combustion engine, the combination of a plurality of cylinders, a centrifugal fan connected to the crank shaft, the fan casing having upright outlet, passages around the cylinders and individual thereto and an air conduit connected to the fan outlet at the bottom of one end of the conduit, the air conduit being closed at its outer end and extending over the heads of the cylinders and having a free and unobstructed passage above the cylinders whereby air can pass the full width of the air conduit and the cylinders to both sides of and between the cylinders, said passages at their tops being of greater diameter than the cylinders and opening directly through the bottom of the conduit and the conduit being of as great width as the diameter of the passages and means at the entrance end of the conduit for distributing the air to the cylinders throughout the length of the unobstructed passage of the conduit.

2. In an air cooled internal combustion engine, the combination of a plurality of cylinders, a centrifugal fan connected to the crank shaft, the fan casing having upright outlet, passages around the cylinders and individual thereto and an air conduit connected to the fan outlet at the bottom of one end of the conduit, the air conduit being closed at its other end and extending over the heads of the cylinders and having a free and unobstructed passage above the cylinders whereby air can pass the full width of the air conduit and the cylinders to both sides of and between the cylinders, said passages at their tops being of greater diameter than the cylinders and opening directly into the bottom of the conduit and the conduit being of as great width as the diameter of the passages, the conduit tapering from its end adjacent the fan outlet toward its closed end and means at the entrance of the conduit for distributing air to the cylinders throughout the length of the unobstructed passage of the conduit in streams the full width of the conduit.

3. In an air cooled internal combustion engine, the combination of a plurality of cylinders, a centrifugal fan connected to the crank shaft, the fan casing having upright outlet, passages around the cylinders and individual thereto and an air conduit connected to the fan outlet at the bottom of one end of the conduit, the air conduit being closed at its other end and extending over the heads of the cylinders and having a free and unobstructed passage above the cylinders whereby air can pass the full width of the air conduit and the cylinders to both sides of and between the cylinder in said passages at their tops being of greater diameter than the cylinders and opening directly through the bottom of the conduit and the conduit being of as great width as the diameter of the passages, the conduit being of equal width throughout its length and its top wall inclining downwardly from the end adjacent the same outlet toward the closed end of the conduit, and means at the entrance end of the conduit for distributing the air throughout the length of the unobstructed passage of the conduit in a stream extending the full width of the conduit.

4. In an air cooled internal combustion engine, the combination of a plurality of cylinders, a centrifugal fan connected to the crank shaft, the fan casing having upright outlet, passages around the cylinders and individual thereto and an air conduit connected to the fan outlet at the bottom of one end of the conduit, the air conduit being closed at its other end and extending over the heads of the cylinders and having a free and unobstructed passage above the cylinders whereby air can pass the full width of the air conduit and the cylinders to both sides of and between the cylinder said passages at their tops being of greater diameter than the cylinder and opening directly into the bottom of the conduit and the conduit being of as great width as the diameter of the passages, and means at the entrance of the conduit for distributing the air throughout the length of the unobstructed conduit in streams arranged one above the other extending the full width of the conduit.

5. In an air cooled internal combustion engine the combination of a plurality of cylinders, a centrifugal fan connected to the crank shaft of the engine, the fan having upright outlet passages around the cylinders and individual thereto and an air conduit connected to the fan outlet at the bottom of one end of the conduit, the conduit being closed at its other end extending over the heads of the cylinders, said passages at their tops being of greater diameter than the cylinders and opening directly through the bottom of the conduit, the conduit having its top wall adjacent the outlet of the fan formed dome shape and of greater height than the remainder of the conduit and said conduit enclosing a single passage communicating throughout its entire width and length with the upper ends of said passages and the portions thereof between the cylinders, and means in the dome shaped portion for distributing the air to the cylinders in streams arranged one above the other and extending the full width of the conduit.

6. In an air cooled internal combustion engine, the combination of a plurality of cylinders, a centrifugal fan connected to the crank shaft of the engine, the fan having upright outlet passages around the cylinders and individual thereto and an air conduit connected to the fan outlet at the bottom of one end of the conduit, the conduit being closed at its other end and extending over the heads of the cylinders, said passages at their tops being of greater diameter than the cylinders and opening directly through the bottom of the conduit, the conduit having its top wall adjacent the outlet of the fan formed dome shaped and of greater height than the remainder of the conduit and said conduit enclosing a single passage communicating throughout its entire width and length with the upper ends of said passages, and the portions thereof between the cylinders, the top wall of the conduit extending downwardly toward the dome shaped portion, and means for distributing the air in layers one above the other the full width of the conduit.

7. In an air cooled internal combustion engine the combination of a plurality of cylinders, a centrifugal fan connected to the crank shaft of the engine, the fan having upright outlet passages around the cylinders and individual thereto and an air conduit connected to the fan outlet at the bottom of one end of the conduit, the conduit being closed at its other end extending over the heads of the cylinders, said passages at their tops being of greater diameter than their cylinders and opening directly through the bottom of the conduit, the conduit having its top wall adjacent the outlet of the fan formed dome-shaped and of greater height than the remainder of the conduit, and said conduit enclosing a single passage communicating throughout its entire width and length with the upper ends of said passage and the portions thereof between the cylinders, and means in the dome shaped portion for distributing the air to the cylinders in streams arranged one above the other and extending the full width of the conduit, said means comprising a plate arranged in the front of the conduit for extending from one side of the conduit to the other and with its front and rear edges extending horizontally in order to divide the air current into layers extending the full width of the air conduit.

8. In an air cooled internal combustion engine the combination of a plurality of cylinders, a centrifugal fan connected to the crank shaft of the engine, the fan having an upright outlet, passages around the cylinders and individual thereto and an air conduit connected to the fan outlet at the bottom of one end of the conduit, the conduit being closed at its other end extending over the heads of the cylinders, said passages at their tops being of greater diameter than the cylinders and opening directly through the bottom conduit, the conduit having its top wall adjacent the outlet of the fan formed dome shape and of greater height than the remainder of the conduit and said conduit enclosing a single passage communicating throughout the entire width and length of the air conduit with the upper ends of said passages, and means in the dome shaped portion for distributing the air to the cylinders in streams arranged one above the other and extending the full width of the conduit, said means comprising curved plates arranged one above the other in the front end of the conduit and curving toward the bottom of the conduit and arranged with their edges extending horizontally in order to divide the air into layers arranged one above the other extending the full width of the air conduit.

9. In an air cooled internal combustion engine the combination of a plurality of cylinders, a centrifugal fan connected to the crank shaft of the engine, the fan having an upright outlet, passages around the cylinders and individual thereto and an air conduit connected to the fan outlet at the bottom of one end of the conduit, the conduit being closed at its other end extending over the heads of the cylinders, said passages and their tops being of greater diameter than their cylinders and opening directly through the bottom conduit, the conduit having its top wall adjacent the outlet of the fan formed dome shape and of greater height than the remainder of the conduit, and said conduit enclosing a single passage communicating throughout its entire width and length with the upper ends of said passages, and the portions between the cylinders, the top wall of the conduit extending downwardly from the dome shaped portion and means for distributing the air in layers one above the other, the full width of the conduit, said means comprising a deflector arranged in the dome-shaped portion of the conduit and curved toward the bottom of the conduit with its edges extending horizontally in order to divide the current of air passing through the conduit into layers arranged one above the other extending the full width of the conduit.

10. In an air cooled internal combustion engine the combination of a plurality of cylinders, a centrifugal fan connected to the crank shaft of the engine, the fan casing having an upright outlet, passages around these cylinders and individual thereto, and an air conduit connected to the fan outlet at the bottom of one end of the conduit, the air conduit being closed at its other end and extending over the heads of the cylinders, said conduit enclosing a space the full width of the passages for communicating therewith throughout the width of the air conduit, said passages at their tops being of greater diameter than the cylinders and opening directly through the bottom of the conduit, the conduit being rectangular in general form in cross section and of as great width as the diameter of the passages, said conduit having its top wall adjacent the outlet formed dome shape in a lengthwise direction and curved in a crosswise direction in an outwardly convexed curve, the dome shaped portion being of greater height than the remaining conduit and the remainder of the top wall of the conduit inclining downwardly toward the closed end of the conduit and being outwardly curved in a crosswise direction, and a distributing plate arranged in the entrance end of the conduit, and extending the full width of the conduit and having its edges extending horizontally in order to divide the current of air into upper and lower layers extending the full width of the air conduit.

11. In an air cooled internal combustion engine, the combination of a plurality of cylinders, a centrifugal fan connected to the crank shaft of the engine, a fan casing having an upright outlet, passages around the cylinders and individual thereto an air conduit connected to the fan outlet at the bottom of one end of the conduit, the air conduit being closed at its other end and extending over the heads of the cylinders and the air conduit confining an open space extending the entire width thereof and communicating throughout its entire width with side passages, and means at the entrance end of the conduit for distributing the air, throughout the conduit in upper and lower layers, extending the full width of the conduit.

12. In an air cooled internal combustion engine the combination of a plurality of cylinders, a centrifugal fan connected to the crank shaft of the engine, a fan casing having an upright outlet, passages around the cylinders and individual thereto an air conduit connected to the fan outlet at the bottom of one end of the conduit, the air conduit being closed at its other end and extending over the heads of the cylinders and the air conduit confining an open space extending the entire width thereof, the conduit also having a dome shaped enlargement at its entrance end and curved plates in said enlargement having the upper and lower edges extending horizontally for distributing the air throughout the length of the conduit in upper and lower layers the full width of the conduit.

13. In an air cooled internal combustion engine the combination of a plurality of cylinders, a centrifugal fan connected to the crank shaft of the engine, a fan casing having an upright outlet, passages around the cylinders and individual thereto, an air conduit connected to the fan outlet at the bottom of one end of the conduit, the air conduit being closed at its other end and extending over the heads of the cylinders and the air conduit confining an open space extending the entire width thereof, the conduit also having a dome shaped enlargement at its entrance end, and a series of curved deflector plates in the front of the conduit and arranged one above the other and curving in the same general direction as the dome.

14. In an air cooled internal combustion engine the combination of a plurality of cylinders, a centrifugal fan connected to the crank shaft of the engine, a fan casing having an upright outlet, passages around the cylinders and individual thereto, an air conduit connected to the fan outlet at the bottom of one end of the conduit, the air conduit being closed at its other end and extending over the heads of the cylinders and the air conduit confining an open space extending the entire width thereof and communicating throughout its entire width with side passages 15 and a curved plate in the entrance end of the conduit extending in the same general direction as the arc of the angle formed by the fan outlet and the air conduit.

15. In an air cooled internal combustion engine the combination of a plurality of cylinders, a centrifugal fan connected to the crank shaft of the engine, a fan casing having an upright outlet, passages around the cylinders and individual thereto, an air conduit connected to the fan outlet at the bottom of one end of the conduit, the air conduit being closed at its other end and extending over the heads of the cylinders and the air conduit confining an open space extending the entire width thereof and communicating throughout its entire width with side passages 15, and means on the air conduit at the junction thereof with the fan outlet for preventing the air from packing against the top of the conduit and thereby disturbing it throughout the height of the conduit.

16. In an air cooled internal combustion engine, the combination of a plurality of cylinders, a centrifugal fan connected to the crank shaft of the engine, a fan casing having upright outlet passages around the cylinders and individual thereto, an air conduit extending horizontally over the heads of the cylinders and connected at one end to the upright fan outlet, and means at the entrance end of the conduit in the junction thereof with the upright outlet for preventing the compressing of the air along the top of the air conduit and thereby distributing it to the cylinders.

17. In an air cooled internal combustion engine, the combination of a plurality of cylinders, a centrifugal fan connected to the crank shaft of the engine, a fan casing having upright outlet passages around the cylinders and individual thereto, an air conduit extending horizontally over the heads of the cylinders and connected at one end to the upright fan outlet, and means at the entrance end of the conduit in the junction thereof with the upright outlet for preventing the compressing of the air along the top of the air conduit and thereby distributing it to the cylinders, said means including a baffle plate arranged in the junction of the air conduit and the upright fan outlet and extending in the same general direction as the top wall of the air conduit at such junction.

18. In an air cooled internal combustion engine, the combination of a plurality of cylinders, a centrifugal fan connected to the crank shaft, the fan casing having an upright outlet, passages around the cylinders and individual thereto, and an air conduit connected to the fan outlet at the bottom of one end of the conduit, closed at its other end and extended over the heads of the cylinders, said passages at their tops being of greater diameter than the cylinders and opening directly through the bottom of the conduit, the conduit being of as great width as the diameter of the passages and said conduit tapering from its end adjacent the fan outlet toward its closed end, and means at the entrance of the conduit for distributing the air throughout the length of the conduit, substantially as and for the purpose specified.

19. In an air cooled internal combustion engine, the combination of a plurality of cylinders, a centrifugal fan connected to the crank shaft, the fan casing having an upright outlet, passages around the cylinders and individual thereto, and an air conduit connected to the fan outlet at the bottom of one end of the conduit, closed at its other end and extended over the heads of the cylinders, said passages at their tops being of greater diameter than the cylinders and opening directly through the bottom of the conduit, the conduit being of equal width throughout its length and its top wall inclining downwardly from the end adjacent the fan outlet toward the closed end of the conduit, and means at the entrance end of the conduit for distributing the air throughout the length of the conduit, substantially as and for the purpose set forth.

20. In an air cooled internal combustion engine, the combination of a plurality of cylinders, a centrifugal fan connected to the crank shaft, the fan casing having an upright outlet, passages around the cylinders and individual thereto, and an air conduit connected to the fan outlet at the bottom of one end of the conduit, closed at its other end and extended over the heads of the cylinders, said passages at their tops being of greater diameter than the cylinders and opening directly through the bottom of the conduit, the conduit being rectangular in general form in cross section and of as great width as the diameter of said passages, the top wall of the conduit inclining downwardly from the receiving end of the conduit toward the closed end thereof, and means at the entrance end of the conduit for distributing the air throughout the length of the conduit, substantially as and for the purpose described.

21. In an air cooled internal combustion engine, the combination of a plurality of cylinders, a centrifugal fan connected to the crank shaft, the fan casing having an upright outlet, passages around the cylinders and individual thereto, and an air conduit connected to the fan outlet at the bottom of one end of the conduit, closed at its other end and extended over the heads of the cylinders, said passages at their tops being of greater diameter than the cylinders and opening directly through the bottom of the conduit, the conduit having its top wall adjacent the outlet of the fan formed dome-shaped and of greater height than the remainder of the conduit, and means in the dome-shaped portion for distributing the air throughout the length of the conduit, substantially as and for the purpose specified.

22. In an air cooled internal combustion engine, the combination of a plurality of cylinders, a centrifugal fan connected to the crank shaft, the fan casing having an upright outlet, passages around the cylinders and individual thereto, and an air conduit connected to the fan outlet at the bottom of one end of the conduit, closed at its other end and exended over the heads of the cylinders, said passages at their tops being of greater diameter than the cylinders and opening directly through the bottom of the conduit, the conduit having its top wall adjacent the outlet of the fan formed dome-shaped and of greater height than the remainder of the conduit, and the top wall of the conduit inclining downwardly from the dome-shaped portion toward the closed end of the conduit, and means in the dome-shaped portion for distributing the air throughout the length of the conduit, substantially as and for the purpose set forth.

23. In an air cooled internal combustion engine, the combination of a plurality of cylinders, a centrifugal fan connected to the crank shaft, the fan casing having an upright outlet, passages around the cylinders and individual thereto, and an air conduit connected to the fan outlet at the bottom of one end of the conduit, closed at its other end and extended over the heads of the cylinders, said passages at their tops being of greater diameter than the cylinders and opening directly through the bottom of the conduit, the conduit being rectangular in general form in cross section and of as great width as the diameter of said passages, and said conduit having its top wall adjacent the outlet formed dome-shaped in a lengthwise direction and curved in a crosswise direction in an outwardly convex curve, the dome-shaped portions being of greater height than the remainder of the conduit and the remainder of the top wall inclining downwardly toward the closed end of the conduit and being outwardly curved in a crosswise direction, and means in the dome-shaped portion for distributing the air throughout the length of the conduit, substantially as and for the purpose described.

24. In an air cooled internal combustion engine, the combination of a plurality of cylinders, a centrifugal fan connected to the crank shaft, the fan casing having an upright outlet, passages around the cylinders and individual thereto, and an air conduit connected to the fan outlet at the bottom of one end of the conduit, closed at its other end and extended over the heads of the cylinders, said passages at their tops being of greater diameter than the cylinders and opening directly through the bottom of the conduit, the conduit being of as great width as the diameter of the passages and said conduit tapering from its end adjacent the fan outlet toward its closed end, and a curved plate arranged in the front end of the conduit, substantially as and for the purpose specified.

25. In an air cooled internal combustion engine, the combination of a plurality of cylinders, a centrifugal fan connected to the crank shaft, the fan casing having an upright outlet, passages around the cylinder and individual thereto, and an air conduit connected to the fan outlet at the bottom of one end of the conduit, closed at its other end and extended over the heads of the cylinders, said passages at their tops being of greater diameter than the cylinders and opening directly through the bottom of the conduit, the conduit being rectangular in general form in cross section and of as great width as the diameter of said passages, and said conduit having its top wall adjacent the outlet formed dome-shaped in a lengthwise direction and curved in a crosswise direction in an outwardly convex curve, the dome-shaped portions being of greater height than the remainder of the conduit and the remainder of the top wall inclining downwardly toward the closed end of the conduit and being outwardly curved in a crosswise direction, and a distributing plate arranged in the entrance end of the conduit, substantially as and for the purpose set forth.

26. In an air cooled internal combustion engine, the combination of a plurality of cylinders, a centrifugal fan connected to the crank shaft, a fan casing having an upright outlet, passages around the cylinders and individual thereto, an air conduit connected to the fan outlet at the bottom of one end of the conduit, closed at its other end, and extended over the heads of the cylinders, and means at the entrance end of the conduit for distributing the air through the conduit, substantially as and for the purpose described.

27. In an air cooled internal combustion engine, the combination of a plurality of cylinders, a centrifugal fan connected to the crank shaft, a fan casing having an upright outlet, passages around the cylinders and individual thereto, an air conduit connected to the fan outlet at the bottom of one end of the conduit, closed at its other end, and extended over the heads of the cylinders, the conduit having an inlet at the lower side of its end adjacent the fan, a dome-shaped enlargement at its entrance end and means in said enlargement for distributing the air throughout the length of the conduit, substantially as and for the purpose specified.

28. In an air cooled internal combustion engine, the combination of a plurality of cylinders, a centrifugal fan mounted on the front end of the crank shaft, a fan casing having a vertical outlet and a spiral wall extending from near the periphery of the fan at one side of the outlet and diverging away from the periphery of the fan to the opposite side of the outlet, passages around the cylinders and individual thereto, an air conduit connected to the fan outlet at the bottom of one end of the conduit, closed at its other end and extended over the heads of the cylinders, said passages at their tops being of greater diameter than the heads of the cylinders and opening directly through the bottom of the conduit, the conduit being of as great width as the diameter of the passages and said conduit tapering from its end adjacent the fan outlet toward its closed end, the conduit having a dome-shaped enlargement at its entrance end above the fan outlet and means in said enlargement for distributing the air throughout the length of the conduit, substantially as and for the purpose set forth.

29. In an air cooled internal combustion engine, the combination of a plurality of cylinders, a centrifugal fan connected to the crank shaft, the fan casing having upright outlet passages around the cylinders and individual thereto and an air conduit connected to the fan outlet at the bottom of one end of the conduit, closed at its other end and extended over the heads of the cylinder, said passages at their tops being of greater diameter than the cylinders and opening directly through the bottom of the conduit, the conduit being rectangular in general form in cross section and of as great width as the diameter of the passages and said conduit tapering from its end adjacent the fan outlet toward its closed end, and said conduit having its top wall adjacent the wall of the fan formed dome shaped, the dome shaped portion being of a greater height than the remainder of the conduit and the remainder of the top wall of the conduit inclining downwardly toward the closed end of the conduit.

In testimony whereof, I have hereunto signed my name, at Syracuse, in the county of Onondaga, and State of New York, this 11th day of August, 1922.

JOHN WILKINSON.